(12) United States Patent
Huston et al.

(10) Patent No.: US 9,547,722 B2
(45) Date of Patent: Jan. 17, 2017

(54) SYSTEM AND METHOD FOR PROVIDING A TEMPORALLY OR GEOGRAPHICALLY RELEVANT ITEM

(71) Applicant: Google Inc., Mountain View, CA (US)

(72) Inventors: Catherine Emma Huston, Woolloomooloo (AU); Ryan James Fioravanti, Kitchener (CA)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/662,343

(22) Filed: Oct. 26, 2012

(65) Prior Publication Data

US 2015/0205813 A1 Jul. 23, 2015

Related U.S. Application Data

(60) Provisional application No. 61/616,391, filed on Mar. 27, 2012.

(51) Int. Cl.
*G06F 7/00* (2006.01)
*G06F 17/30* (2006.01)

(52) U.S. Cl.
CPC ..... *G06F 17/3087* (2013.01); *G06F 17/30241* (2013.01)

(58) Field of Classification Search
CPC ................................................ G06F 17/30241

USPC ......................................................... 707/725
See application file for complete search history.

(56) References Cited

U.S. PATENT DOCUMENTS

| 8,671,095 | B2 | 3/2014 | Gross |
| 2005/0102368 | A1* | 5/2005 | Forman et al. ............... 709/207 |
| 2007/0073690 | A1* | 3/2007 | Boal et al. ....................... 707/6 |
| 2007/0078849 | A1* | 4/2007 | Slothouber ............ G06Q 30/02 |
| 2007/0237096 | A1* | 10/2007 | Vengroff ................. H04W 4/02 370/254 |
| 2007/0281689 | A1* | 12/2007 | Altman et al. ............. 455/435.1 |

\* cited by examiner

*Primary Examiner* — Ajith Jacob
(74) *Attorney, Agent, or Firm* — McDermott Will & Emery LLP

(57) ABSTRACT

A system and method for providing at least one of a geographically relevant item or a temporally relevant item are provided. A geographical location or temporal information of a device that is configured to access items associated with an electronic messaging account is determined. First items associated with the electronic messaging account are filtered to obtain an item relevant to the determined geographical location or temporal information. Second items associated with the electronic messaging account are filtered to obtain one or more items contextually relevant to the relevant item. The relevant item and one or more items contextually relevant to the relevant item are provided for display, wherein the display is differentiated from other items of the electronic messaging account.

20 Claims, 6 Drawing Sheets

SYSTEM AND METHOD FOR PROVIDING A TEMPORALLY OR GEOGRAPHICALLY RELEVANT ITEM

CROSS-REFERENCE TO RELATED APPLICATIONS

The present application claims the benefit of U.S. Provisional Patent Application Ser. No. 61/616,391, entitled "System and Method for Providing a Temporally or Geographically Relevant Item," filed on Mar. 27, 2012, which is hereby incorporated by reference in its entirety for all purposes.

FIELD

The subject technology generally relates to providing an item for display and, in particular, relates to providing a geographically and/or temporally relevant item for display.

BACKGROUND

Electronic messaging applications provide users with many electronic messages of varying degrees of importance on a daily basis. Electronic messaging applications may also provide users with access to information not related to a particular electronic message, such as another user's contact information.

SUMMARY

The disclosed subject matter relates to a computer-implemented method for providing at least one of a geographically relevant item or a temporally relevant item. The method comprises determining a geographical location or temporal information of a device, wherein the device is configured to access items associated with an electronic messaging account. The method also comprises filtering first items associated with the electronic messaging account to obtain an item relevant to the determined geographical location or the determined temporal information. The method also comprises filtering second items associated with the electronic messaging account to obtain one or more items contextually relevant to the relevant item. The method also comprises providing for display the relevant item and the one or more items contextually relevant to the relevant item, wherein the provided display is differentiated from other items of the electronic messaging account.

The disclosed subject matter further relates to a system for providing at least one of a geographically relevant item or temporally relevant item. The system comprises a memory storing executable instructions. The system also comprises one or more processors configured to execute executable instructions stored in the memory, which when executed by the processors, cause the processors to determine a geographical location or temporal information of a device, wherein the device is configured to access items associated with an electronic messaging account. The system also comprises one or more processors configured to execute executable instructions stored in the memory, which when executed by the processors, cause the processors to filter first items associated with the electronic messaging account to obtain an item relevant to the determined geographical location or the determined temporal information further comprising determining geographical location or temporal information for the first items, comparing the geographical location or temporal information for the first items with the determined geographical location or the determined temporal information of the device, respectively, and filtering the first items to obtain the relevant item, based on the comparison. The system also comprises one or more processors configured to execute executable instructions stored in the memory, which when executed by the processors, cause the processors to filter second items associated with the electronic messaging account to obtain one or more items contextually relevant to the relevant item. The system also comprises one or more processors configured to execute executable instructions stored in the memory, which when executed by the processors, cause the processors to provide for display, the relevant item and the one or more items contextually relevant to the relevant item, wherein the provided display is differentiated from other items of the electronic messaging account.

The disclosed subject matter also relates to a machine-readable medium storing machine-executable instructions for providing at least one of a geographically relevant item or a temporally relevant item for viewing on a mobile device. The instructions comprise code which when executed by a machine, cause the machine to determine a geographical location of a mobile device, wherein the mobile device is configured to access items associated with an electronic messaging account. The instructions further comprise code which when executed by a machine, cause the machine to filter first items associated with the electronic messaging account to obtain an item relevant to the determined geographical location or the determined temporal information further comprising instructions for determining geographical location or temporal information for the first items, comparing the geographical location or temporal information for the first items with the determined geographical location or the determined temporal information of the mobile device, respectively, and filtering the first items to obtain the relevant item, based on the comparison. The instructions further comprise code which when executed by a machine, cause the machine to filter second items associated with the electronic messaging account to obtain one or more items contextually relevant to the relevant item. The instructions further comprise code which when executed by a machine, cause the machine to provide for display on the mobile device, the relevant item and the one or more items contextually relevant to the relevant item, wherein the provided display is differentiated from other items of the electronic messaging account.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
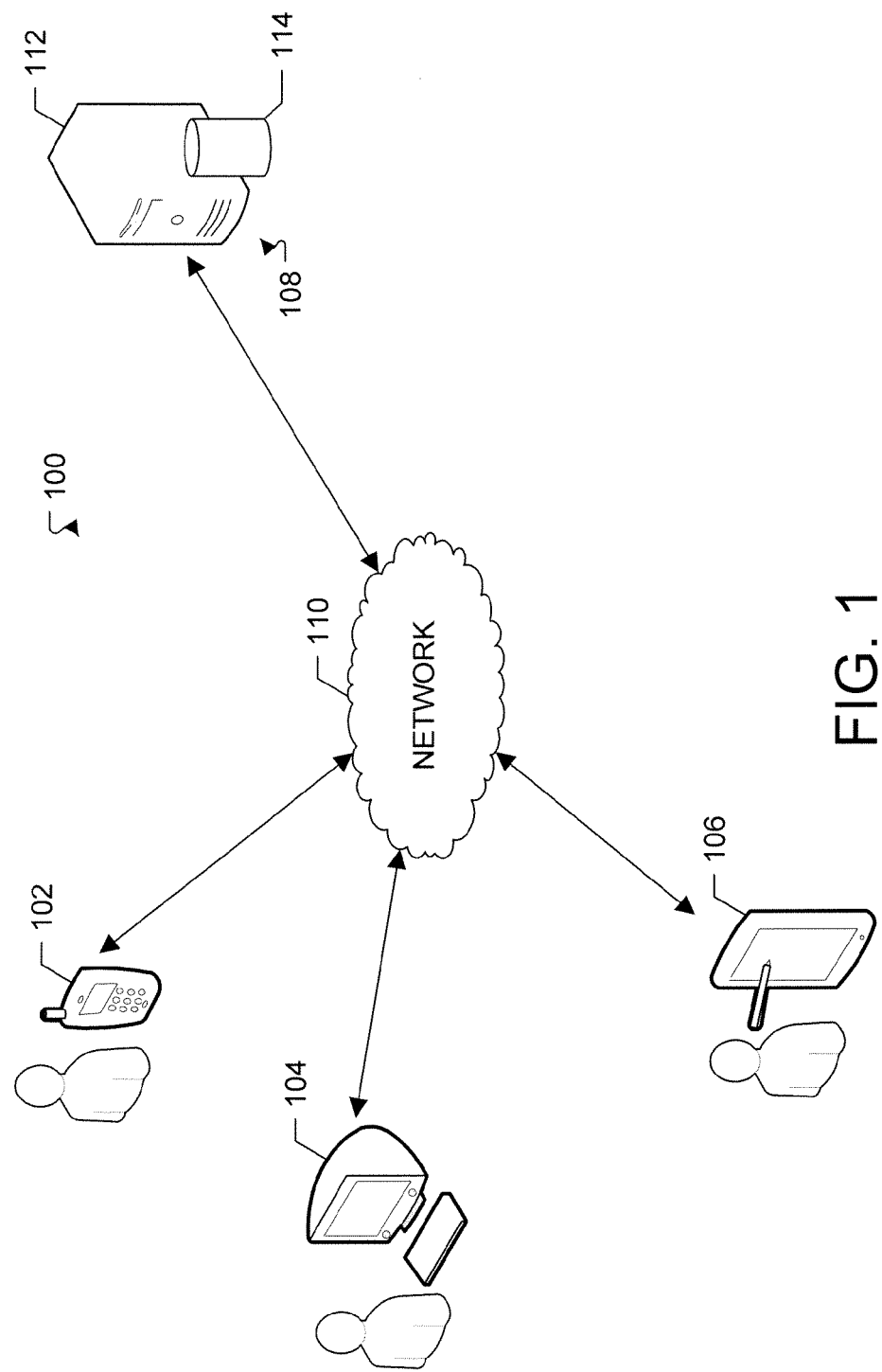
FIG. 1 illustrates an example distributed network environment which can provide an electronic messaging account with at least one of a geographically relevant item or a temporally relevant item.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In accordance with the subject technology, a system and a method are provided for providing temporally or geographically relevant information for display in an electronic messaging account. The system may utilize a calendar, a Global Positioning System (GPS), or other accessible software and/or hardware components to determine a user's temporal information and geographical location. Once the user's temporal information and geographical location have been ascertained, the subject technology filters items the user's electronic messaging account has access to for items relevant to the user's temporal or geographical location.

An item may be any data related to information accessible to an electronic messaging account. An item may contain information related an electronic message accessible to the electronic messaging account, e.g., an electronic message containing a flight itinerary. An item may also contain information related to an electronic message and is accessible to the electronic messaging account, e.g., information pertaining to a friend's birthday or the friend's contact information. Additional examples of items may include information about an advertisement, an event, a birthday or a group trip. Some additional examples of items are provided herein. It will be apparent, however, that items may contain information not limited to the specific details set forth herein and may contain additional information accessible to an electronic messaging account.

Where the system has ascertained the current time and the user's current position, an electronic message containing the user's e-boarding pass to board a flight from an airport within a few miles of the user device's location would be both temporally and geographically relevant to the user, whereas an e-ticket to attend an event one year from the current date and across the world from the user device's location would be neither temporally nor geographically relevant. Upon obtaining an item of temporal or geographical relevance, the subject technology initiates a second filtering process to obtain one or more items contextually relevant to the relevant item. For example, if the subject technology locates a temporally relevant item pertaining to a group trip, additional items contextually relevant to the group trip may include, but is not limited to information about other group members, the user's past interactions with the other members, the other members' blog posts, and information about the destination.

The subject technology may provide relevant items for display in a number of different ways to provide a visual representation of natural relationships between filtered relevant items and items contextually relevant to the filtered relevant items. One way is to configure an electronic messaging application to provide a shortcut to geographically relevant and temporally relevant items for display on a device. Another way is to configure an electronic messaging application to provide a folder containing geographically relevant and temporally relevant items for display on a device. Temporally relevant items may be assigned a color that is different from geographically relevant items to distinguish the temporally relevant items from the geographically relevant items. The electronic messaging application may be configured to provide additional visual representations to show relationships between temporally relevant and geographically relevant items and to differentiate these relevant items from other items of the electronic messaging account.

A selection of a particular relevant item may expand the electronic messaging interface to display additional items that are contextually relevant to the relevant item. For example, a user's selection of an item pertaining to a group trip may expand the electronic messaging application's interface to display flight itineraries, information about other group members, the user's past interactions with the other member, the other group members' blog posts, and information about the destination.

Multiple relevant items may share a common characteristic and may be grouped by a shared characteristic and displayed as a group. For example, if the subject technology detects that a user has 10 friends with birthdays in the next week, the subject technology can group items related to each birthday into a single "birthday" group and display a "birthday" group within the "relevant box" folder. A user can access items related to each birthday in the birthday group by initiating a user action (e.g., a user click, a hover action, a tap action, a swipe action, etc). A user selectable control may be included and may be configured to allow the user to remove items the user is not interested in. A second user selectable control may be included and may be configured to allow the user to specify a temporal and geographical range of relevancy.

FIG. 1 illustrates an example distributed network environment 100 which can provide an electronic messaging account with at least one of a geographically relevant item or a temporally relevant item according to certain aspects of the disclosure.

A network environment 100 includes a number of devices 102-106 communicably connected to a server 108 by a network 110. Server 108 includes a processing device 112 and a data store 114. Processing device 112 executes computer instructions stored in data store 114, for example, to provide a geographically relevant item to any of devices 102-106.

In some example aspects, each of devices 102-106 may be any machine with appropriate hardware and software to run an electronic messaging application. Devices 102-106 can be mobile devices (e.g., smartphones, tablet computers, PDAs, and laptop computers), portable media players, or other appropriate computing devices. In the example of FIG. 1, device 102 is depicted as a smartphone, device 104 is depicted as a desktop computer, and device 106 is depicted as a PDA.

In some example aspects, each of the devices 102-106 may include one or more location detection hardware and/or software such as a GPS configured to determine geographical location of the respective devices. Furthermore, each of the devices 102-106 may also include one or more temporal information hardware and/or software (e.g., a calendar software) configured to determine temporal information about the respective devices. Furthermore, each of devices may also contain an electronic messaging application configured to access items associated with an electronic messaging account. Furthermore, each of the devices 102-106 may transmit geographical location and temporal information about the respective device to server 108. Furthermore, each of the devices 102-106 may receive one or more items determined to be relevant to an electronic messaging account user. Furthermore, each of the devices 102-106 may provide one or more items determined to be relevant to an electronic messaging account user for display on an electronic messaging application in a manner that differentiates the relevant items from other items of the electronic messaging account.

Server 108 may be any system or device having a processor, a memory, and communications capability appropriate for providing temporally or geographically relevant items. Server 108 can be a single computing device such as a computer server. In other embodiments, server 108 can represent more than one computing device working together to perform the actions of a server computer (e.g., cloud computing).

Server 108 may contain items associated with one or more electronic messaging accounts. Furthermore, server 108 also may also contain one or more sets of filtering parameters corresponding to different electronic messaging accounts. Furthermore, server 108 may filter items associated with an electronic messaging account based on a set of filtering parameters for the electronic messaging account. Furthermore, server 108 may compare a geographical location or a temporal information for an item associated with the electronic messaging account with a geographical location or temporal information of a device displaying the electronic messaging account to obtain a geographically and/or temporally relevant item. Furthermore, server 108 may compare an item associated with the electronic messaging account with a geographically and/or temporally relevant item to obtain one or more items contextually relevant to the temporally and/or geographically relevant item. Furthermore, the server 108 may transmit one or more items obtained from the filtering process to the devices 102-106 via the network 110.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
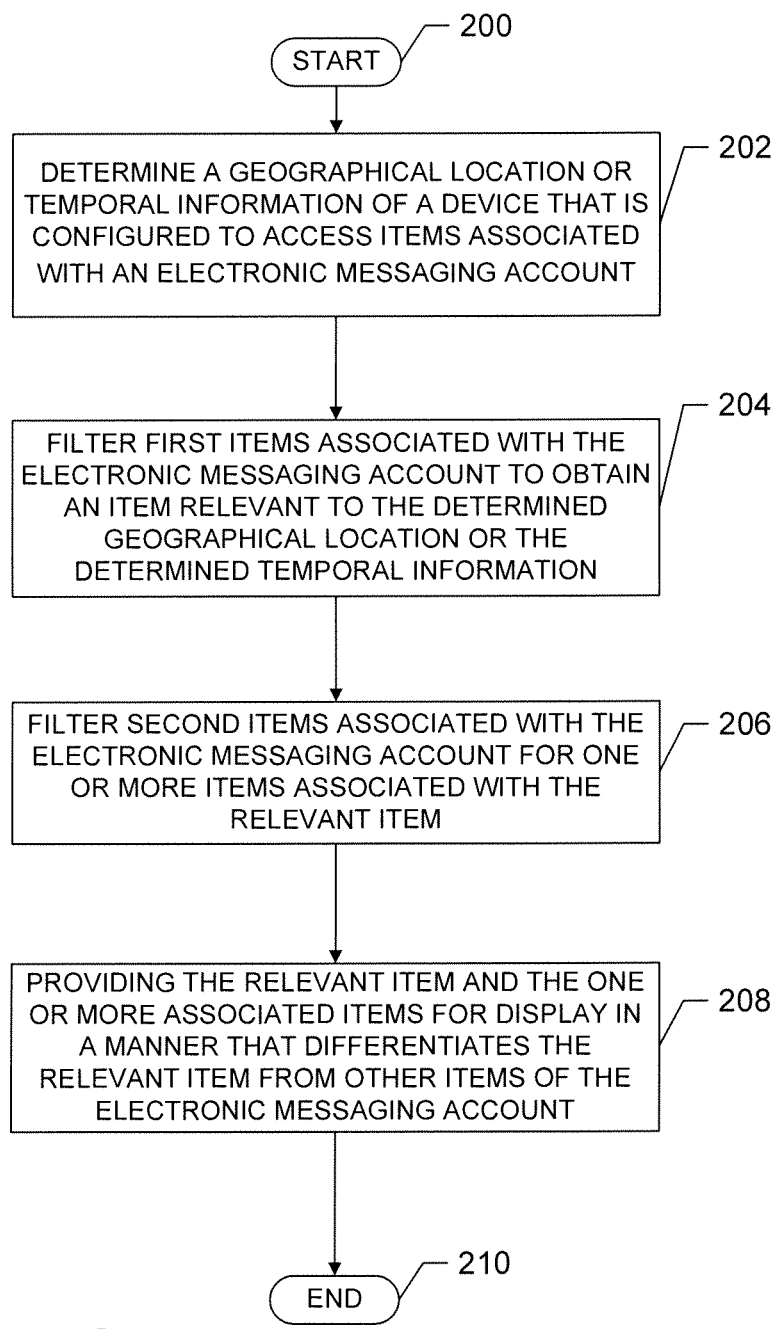
FIG. 2 illustrates an example process by which at least one of a geographically relevant item or a temporally relevant item is provided.

FIG. 2 illustrates an example process by which at least one of a geographically relevant item or a temporally relevant item is provided. Following start block 200, a determination of a geographical location or a temporal information of a device that is configured to access items associated with an electronic messaging account is made in step 202. The device may contain location detection hardware and/or software (e.g., a GPS device) configured to obtain the device's geographical location and to provide the geographical location to server. The device's user may also provide server with the geographical location of the device via a user selectable control integrated to an electronic messaging application and configured to allow the user to input a geographical location and transmit the inputted geographical location to the server. The device may also contain temporal information hardware and/or software (e.g., a calendar software). The device user may also provide server with temporal information about the device via a user selectable control integrated to an electronic messaging application and configured to allow the user to input a temporal information and transmit the inputted temporal information to the server.

At step 204, server filters first items associated with the electronic messaging account to obtain an item relevant to the geographical location or the temporal information transmitted from the device in step 202. Filtering the first items may include determining geographical location or temporal information for the first items. This may include analyzing information related to the geographical location or the temporal information for the first items. Upon determining the geographical location or the temporal information for the first items, a comparison of the geographical location or the temporal information for the first items with the determined geographical location or the determined temporal information of the device, respectively, may be made. Comparison of the first items with the device may also include utilizing a set of parameters to determine the first items' relevance. The set of parameters may include parameters related to the device's geographical location and temporal information. The set of parameters may also include a user inputted range of geographical or temporal relevance. Additional methods of comparing the first items to the device to obtain a relevant item may be implemented based on the geographical location or the temporal information of the first items and the device, respectively.

At step 206, server filters second items associated with the electronic messaging account to obtain one or more items contextually relevant to the relevant item obtained in step 204. Filtering the second items may include determining historical information for the second items. Historical information for an item may relate to secondary information about the item, such as, information about the source of the item, information about one or more individuals and/or destination identified by the item, or information about the user's prior interactions with one or more individuals and/or destination identified by the item. Where an item relates to an electronic message about a group trip, historical information for the item may include information about the sender of the electronic message, information about one or more individuals identified by the electronic message as participants of the group trip, chat histories between the user and the other members of the group trip, prior blog posts by the other members of the group trip or information about the group trip's destination.

Filtering the second items may further include comparing the historical information for the second items with the historical information for the relevant item. Comparison of the historical information for the second items with the historical information of the relevant item may include assessing their common properties, such as a having a common source, or relating to identical parties. Additional methods of comparing the historical information for the second items to the relevant item to obtain one or more items contextually relevant to the relevant item may be implemented based on comparing additional information related to the second items with information related to the relevant item.

At step 208, the relevant item and the one or more items contextually relevant to the relevant item are provided for display in a manner that differentiates the relevant item from other items of the electronic messaging account. The server may transmit the relevant item and the one or more items contextually relevant to the relevant item to the device via the network for display by an electronic messaging application running on the device. Providing for display, the relevant item and the one or more items contextually relevant to the relevant item may include assigning the relevant item and the one or more items contextually relevant to the relevant item to a folder that is differentiated from the other folders. Where an electronic messaging application is configured to display folders for incoming electronic messages and outgoing electronic messages on the device it runs on, a new folder may be created for displaying relevant items and items associated with the relevant items on the device.

Providing for display, the relevant item and the one or more items contextually relevant to the relevant item may also include assigning the relevant item, based on the relevant item's temporal or geographical relevance, to different subfolders within the folder for relevant items. A subfolder may be configured to display geographically relevant items, and a different subfolder may be configured to display temporally relevant items. A subfolder configured to display a relevant item may also be configured to display one or more levels subfolders which are configured to display the one or more items contextually relevant to the relevant item.

Providing for display of the relevant item and the one or more items contextually relevant to the relevant item may further include assigning a color to the relevant item and the one or more items contextually relevant to the relevant item, wherein, the assigned color is based on whether the relevant item is relevant to the determined geographical location, the determined temporal information, and/or both, and providing for display, the relevant item and the one or more items contextually relevant to the relevant item in the assigned color. The one or more items contextually relevant to the relevant item may be further assigned to one or more colors based on their level or association or their type of association with the relevant item. Additional methods of assigning different colors based on the relevant item and the one or more items contextually relevant to the relevant item may be implemented to facilitate the user to differentiate different relevant items, and the one or more items contextually relevant to the different relevant items from each other, respectively.

Alternatively, providing for display, the relevant item and the one or more items contextually relevant to the relevant item may also include providing a shortcut to the relevant item and the one or more items contextually relevant to the relevant item. The electronic messaging application may be configured to provide additional visual representations to show relationships between the relevant item and the one or more one or more items contextually relevant to the relevant item, and to differentiate these relevant items from other items of the electronic messaging account. The process then ends at end block 210.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figures 3A, 3B:
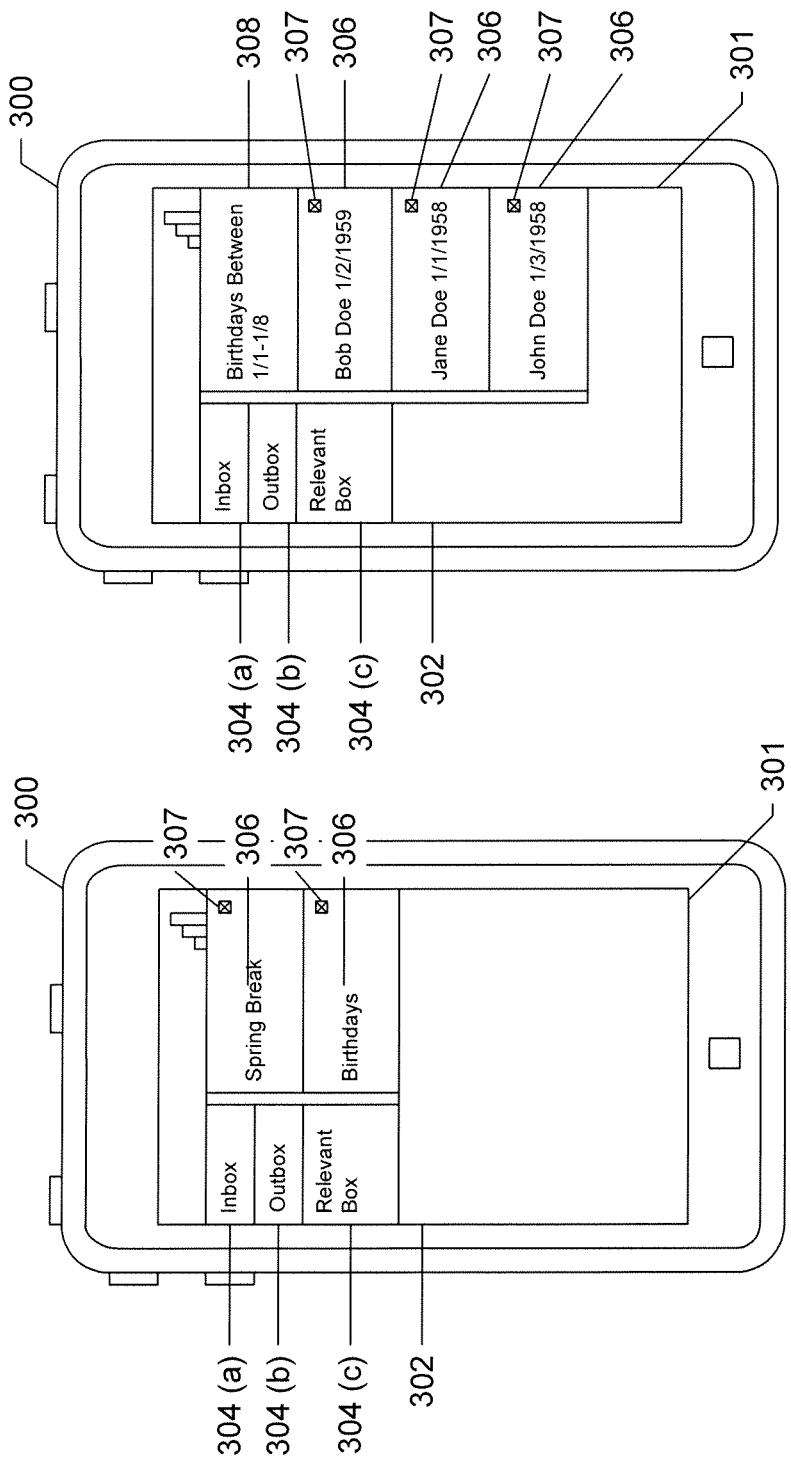
FIG. 3A illustrates an example image of a graphical user interface for an electronic messaging application running on a mobile device.
FIG. 3B illustrates an example image of a folder of the electronic messaging account running on the electronic messaging application of FIG. 3A, wherein the folder contains multiple relevant items related to each other by a shared characteristic.

FIG. 3A illustrates an example image of a graphical user interface of an electronic messaging application running on a mobile device 300. The electronic messaging application 302 may include any web browsing software or electronic messaging software 302 configured to group and display items accessible to an electronic messaging account on the mobile device's display screen 301. The electronic messaging application as shown in FIG. 3A is configured to group items accessible to the electronic messaging account into three folders (an "inbox" folder 304 (*a*) for incoming electronic messages, an "outbox" folder 304 (*b*) for outgoing electronic messages and a "relevant box" folder 304 (*c*) for relevant items associated with the electronic messaging account) and display the three folders on the mobile device's display screen 301. Alternative examples of electronic messaging applications may be configured to group items associated with the electronic messaging account differently. Alternative examples of electronic messaging applications may also be configured to display a different number of folders, with different naming conventions.

The electronic messaging application as shown in FIG. 3A is further configured to display two relevant items 306 associated with the "relevant box" folder 304 (*c*) in response to a user action (e.g., a user click, a hover action, a tap action, a swipe action, etc.) above the "relevant box" folder 304 (*c*) area of the mobile device's display screen 301. Alternatively, a "short cut" or another visual representation may be used to represent natural relationships between the two relevant items and differentiate the two relevant items from other items of the electronic messaging account. Context information related to the two relevant items 306 and items associated with the two relevant items may be displayed in response to the user action above areas of the mobile device's display screen 301 where the two relevant items 306 are displayed respectively. Each of the two relevant items may also contain a separate user selectable control 307 configured to initiate a user response to separately remove the items. Alternative examples of an electronic messaging application may be configured to display the two relevant items in a different location with respect to the mobile device's display screen 301. Alternative examples of electronic messaging applications may also provide the two relevant items 306 for display in a different manner that differentiates the two relevant items 306 from other items of the electronic messaging account than the example shown in FIG. 3A.

FIG. 3B illustrates an example image of a folder of the electronic messaging account running on the electronic messaging application 302 of FIG. 3A, wherein the folder contains multiple relevant items 306 related to each other by a shared characteristic. In particular, FIG. 3B displays multiple relevant items 306 related to birthdays within a certain time frame, and grouped within a "birthday" folder. The "birthday" folder may be displayed similar to the "birthday" item 306 as shown in FIG. 3A. Relevant items 306 within the "birthday" folder may be accessed by a user action on an area of the mobile device's display screen 301 where the "birthday" folder is displayed or in response to the user action above the area where the "birthday" folder is displayed.

The example image as shown in FIG. 3B displays a context information 308 about the shared characteristic of relevant items within the folder and three relevant items 306 all having the shared characteristic. Each of the three relevant items 306 may contain additional context information about the respective relevant item. Additional context information about one of the three relevant items may be accessed in response to a user action (e.g., a mouse click, a hover action, a swipe action, a tap action, etc.) above the area of the mobile device's display screen 301 where corresponding relevant item 306 is displayed. Each relevant item 306 may also contain a separate user selectable control 307 configured to initiate a user response to separately remove the relevant items. Relevant items 306 may be grouped by different characteristics and may contain more or less context information about the shared characteristic. Alternative examples of a folder containing multiple relevant items having a shared characteristic may be displayed in a different manner that differentiates the group of relevant items having the shared characteristic from other relevant items than the example illustration shown in FIG. 3B. Furthermore, a "short cut" or another visual representation may be used to represent natural relationships between relevant items and differentiate the relevant items from other items of the electronic messaging account.

Figure 3D:
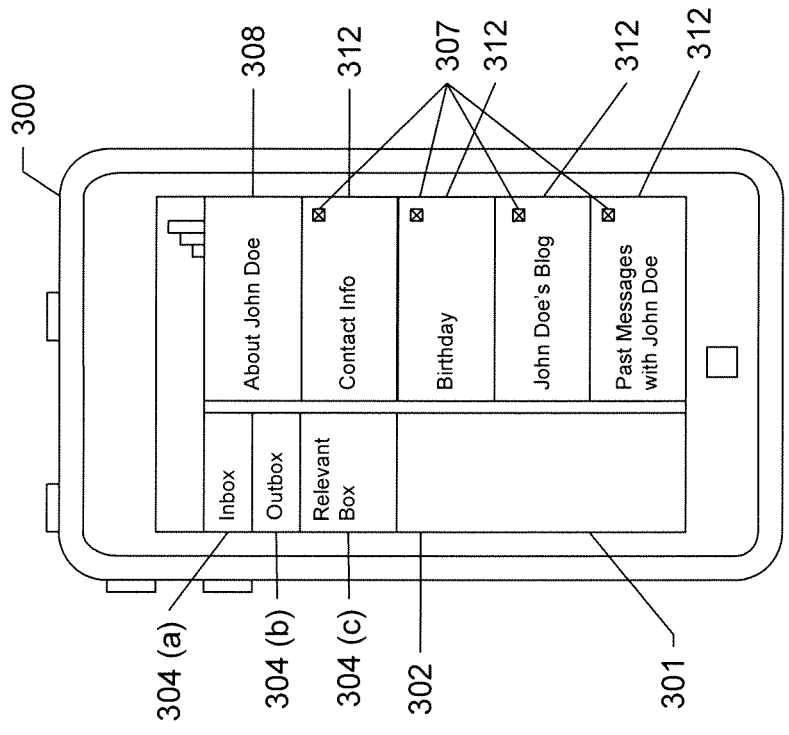
FIG. 3D illustrates an example image of a subfolder which contains one or more items contextually relevant to a relevant item, the one or more items contextually relevant to the relevant item also having a shared characteristic.
Figure 3C:
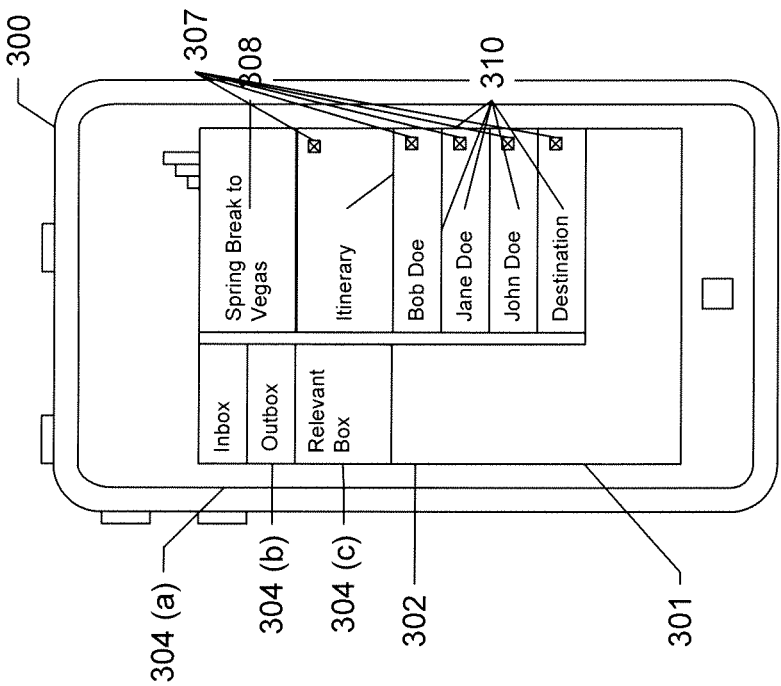
FIG. 3C illustrates an example image of a subfolder which contains one or more items contextually relevant to a relevant item.

FIG. 3C illustrates an example image of a subfolder which contains one or more items contextually relevant to a relevant item 310. In particular FIG. 3C displays multiple items contextually relevant to a "Spring Break" relevant item 310 shown in FIG. 3A. The multiple items contextually relevant to the "Spring Break" relevant item 310 as shown in FIG. 3A may be accessed in response to a user action above the area of the mobile device's display screen 301 where the "Spring Break" relevant item 306 is being displayed. The example image as shown in FIG. 3C displays a context information 308 about the item, an itinerary item contextually relevant to the "Spring Break" 310, items related to three participants of the "Spring Break" 310, and an item about the destination of the "Spring Break" 310. One or more items contextually relevant to the "Spring break" relevant item may also contain a separate user selectable control 307 configured to initiate a user response to separately remove the items contextually relevant to the "Spring Break" relevant item. Alternative examples of a subfolder containing one or more items contextually relevant to a relevant item may be displayed in a different manner that differentiates the one or more items contextually relevant to the relevant item from other items than as shown in FIG. 3C. Alternatively, a "short cut" or another visual representation may be used to represent natural relationships between the one or more items contextually relevant to a relevant item, and differentiate the one or more items contextually relevant to the relevant item from other items of the electronic messaging account.

FIG. 3D illustrates an example image of a subfolder which contains one or more items contextually relevant to a relevant item, the one or more items contextually relevant to the relevant item also having a shared characteristic. In particular, FIG. 3D displays four items contextually relevant to the "Spring Break" relevant item 312, each of the four items also containing information related to "John Doe" who is one of the participants of the "Spring Break". The four items 312 shown in FIG. 3D are grouped within a "John Doe" subfolder to differentiate the items related to John Doe from other items contextually relevant to the "Spring Break" relevant item. The subfolder shown in FIG. 3D also contains context information 308 about the shared characteristic of the four items in the subfolder.

The "John Doe" subfolder may have an appearance similar to the John Doe item 310 as shown in FIG. 3C. Furthermore, the four items 312 within the "John Doe" subfolder may be accessed in response to a user action above the area of the mobile device's display screen 301 where the "John Doe" subfolder is displayed. Each of the four items 312 within the "John Doe" subfolder may also contain a separate user selectable control 307 configured to initiate a user response to separately remove the item. Additional subfolders may contain one or more items contextually relevant to a relevant item, the one or more other items contextually relevant to the relevant item also having a shared characteristic. Alternative examples of a subfolder containing one or more items contextually relevant to a relevant item, the one or more items contextually relevant to the relevant item also having a shared characteristic may be displayed in a different manner that differentiates the one or more items contextually relevant to the relevant item and also having a shared characteristic from other items than illustrated in FIG. 3D. Alternatively, a "short cut" or another visual representation may be used to represent natural relationships between one or more items contextually relevant to a relevant item, the one or more items contextually relevant to the relevant item also having a shared characteristic, and differentiate these relevant to the relevant item from other items of the electronic messaging account.

Figure 4:
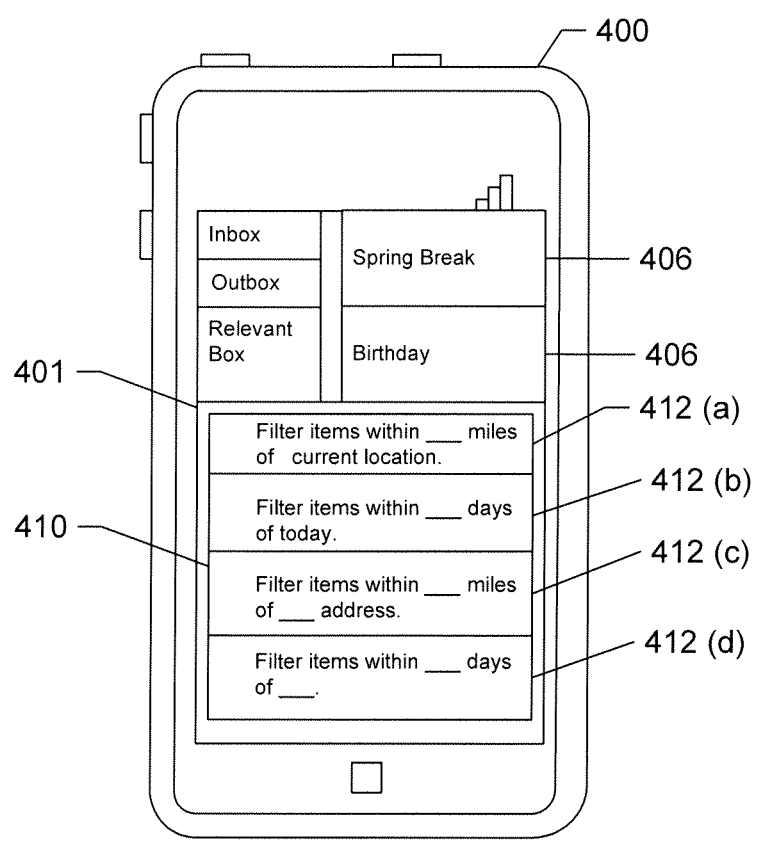
FIG. 4 illustrates an example image of a user selectable control configured to allow a user to designate one or more geographically or temporally relevant parameters.

FIG. 4 illustrates an example image of a user selectable control 410 configured to allow a user to designate one or more geographically or temporally relevant parameters 412 (a)-412 (d). The user selectable control 410 as shown in FIG. 4 contains four filter parameters. A first filter parameter 412 (a) allows the user to limit relevant items within a user designated range of the location of a device 400. Items relevant within the user designated range may be considered as relevant whereas items not relevant to within the user's designated range are filtered out. A second filter parameter 412 (b) allows the user to limit relevant items within a temporal range of the date as indicated by the device 400. A third filter parameter 412 (c) allows the user to limit relevant items within a user designated range of a user designated location. A forth filter parameter 412 (d) allows a user to filter items within a user designated temporal range of a user designated date. Additional filter parameters may include other filtering parameters based on geographical location or temporal information. The user selectable control 410 is configured to respond to a user input of one or more parameters by filtering out items not relevant within the user designated parameters. The user selectable control for filter parameters 410 as shown in FIG. 4 is displayed beneath the two relevant items shown in FIG. 3A. Alternative examples of a user selectable control for filter parameters may be displayed anywhere else with respect to the device's display screen 301.

Figure 5:
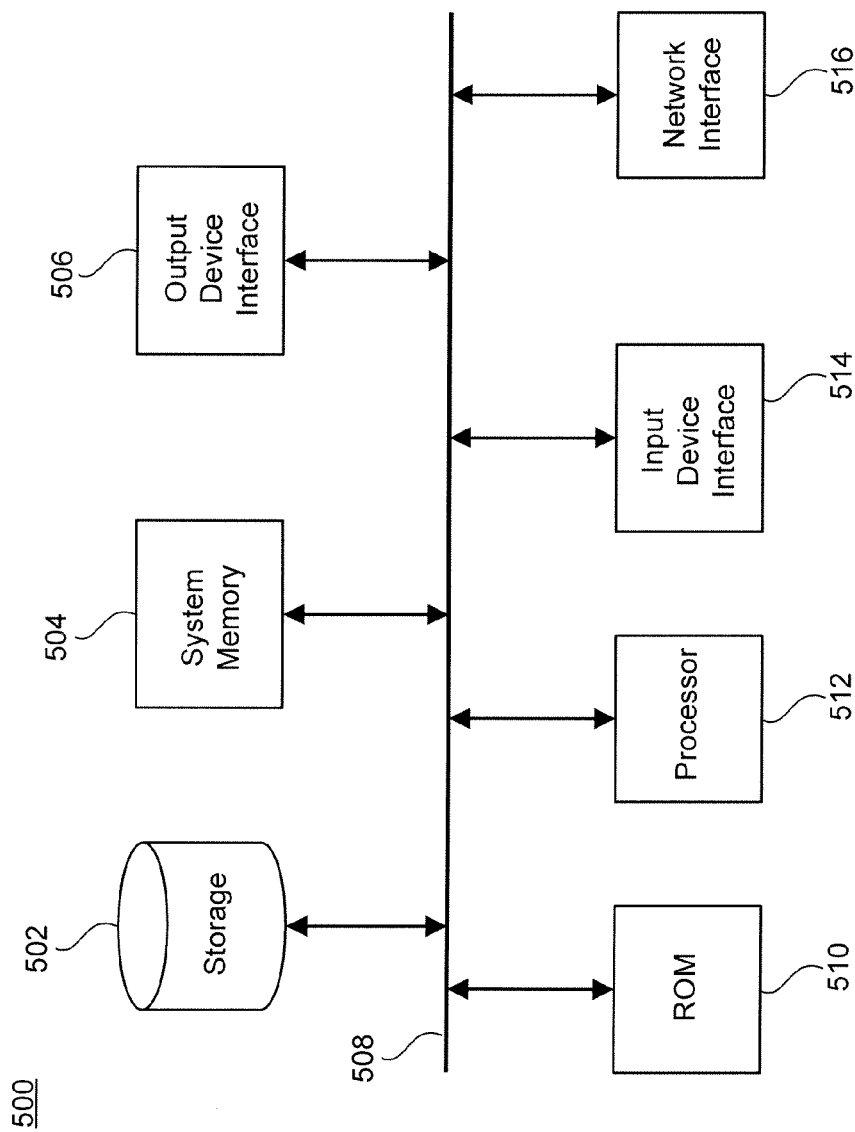
FIG. 5 conceptually illustrates an electronic system with which some implementations of the subject technology are implemented.

FIG. 5 conceptually illustrates an electronic system with which some implementations of the subject technology are implemented. Electronic system 500 can be a laptop computer a desktop computer, smartphone, PDA, a tablet computer or any other sort of device 102-106. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for providing graphically or temporally relevant items in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on a device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method comprising:
 determining a geographical location or temporal information of a device, wherein the device is configured to access items associated with an electronic messaging account;

filtering first items associated with the electronic messaging account to obtain an item relevant to the determined geographical location or the determined temporal information;

identifying an event, for user participation, based on the relevant item;

filtering second items associated with the electronic messaging account to obtain one or more items contextually relevant to the identified event, the second items being different than the filtered first items and the event, the obtained one or more items comprising an event characteristic which is shared with the relevant item, and which is different than a geographical characteristic or a temporal characteristic; and providing for display, the relevant item and the one or more items contextually relevant to the identified event, wherein the relevant item provided for display is differentiated from other items of the electronic messaging account.

2. The computer-implemented method of claim 1, wherein filtering the first items further comprises:

determining geographical location or temporal information for the first items;

comparing the geographical location or temporal information for the first items with the determined geographical location or the determined temporal information of the device, respectively; and filtering the first items to obtain the relevant item, based on the comparison.

3. The computer-implemented method of claim 1, wherein filtering the second items further comprises:

determining historical information for the second items;

determining historical information for the relevant item;

comparing the historical information for the second items with the historical information for the relevant item; and filtering the second items to obtain the one or more items contextually relevant to the identified event, based on the comparison.

4. The computer-implemented method of claim 3, wherein historical information for an item comprises information about the item's source, individuals identified by the item, one or more destinations identified by the item, or a user's prior interactions with the individuals identified by the item.

5. The computer-implemented method of claim 1, further comprising assigning the relevant item and the one or more items contextually relevant to the identified event to a folder that is differentiated from other folders of the electronic messaging account.

6. The computer-implemented method of claim 5, further comprising assigning the relevant item and the one or more items contextually relevant to the identified event to different subfolders within the folder based on the relevant item's temporal or geographical relevance.

7. The computer-implemented method of claim 1, wherein providing for display further comprises:

assigning a color to the relevant item and the one or more items contextually relevant to the identified event, wherein, the assigned color is based on whether the relevant item is relevant to the determined geographical location, temporal information, or both; and providing for display, the relevant item and the one or more items contextually relevant to the identified event in the assigned color.

8. The computer-implemented method of claim 1, wherein the relevant item is relevant to the determined geographical location, and the relevant item comprises an advertisement, an itinerary or an address.

9. A system comprising:

a memory storing executable instructions; and one or more processors configured to execute the executable instructions stored in the memory, which when executed by the processors, cause the processors to perform operations comprising:

determining a geographical location or temporal information of a device, wherein the device is configured to access items associated with an electronic messaging account;

filtering first items associated with the electronic messaging account to obtain an item relevant to the determined geographical location or the determined temporal information further comprising:

determining geographical location or temporal information for the first items;

comparing the geographical location or temporal information for the first items with the determined geographical location or the determined temporal information of the device, respectively; and filtering the first items to obtain the relevant item, based on the comparison;

identifying an event, for user participation, based on the relevant item;

filtering second items associated with the electronic messaging account to obtain one or more items contextually relevant to the identified event, the second items being different than the filtered first items and the event, the obtained one or more items comprising an event characteristic which is shared with the relevant item, and which is different than a geographical characteristic or a temporal characteristic; and providing for display, the relevant item and the one or more items contextually relevant to the identified event, wherein the relevant item provided for display is differentiated from other items of the electronic messaging account.

10. The system of claim 9, wherein filtering the second items further comprises:

determining historical information for the second items;

determining historical information for the relevant item;

comparing the historical information for the second items with the historical information for the relevant item; and filtering the second items to obtain the one or more items contextually relevant to the identified event, based on the comparison.

11. The system of claim 10, wherein historical information for an item comprises information about the item's source, individuals identified by the item, one or more destinations identified by the item, or a user's prior interactions with the individuals identified by the item.

12. The system of claim 9, further comprising assigning the relevant item and the one or more items contextually relevant to the identified event to a folder that is differentiated from other folders of the electronic messaging account.

13. The system of claim 12, further comprising assigning the relevant item and the one or more items contextually relevant to the identified event to different subfolders within the folder based on the relevant item's temporal or geographical relevance.

14. The system of claim 9, wherein providing for display further comprises:

assigning a color to the relevant item and the one or more items contextually relevant to the identified event, wherein, the assigned color is based on whether the relevant item is relevant to the determined geographical location, temporal information, or both; and providing for display, the relevant item and the one or more items contextually relevant to the identified event in the assigned color.

15. A machine-readable medium storing machine-executable instructions which when executed by a machine cause the machine to perform operations comprising:

determining a geographical location or temporal information of a mobile device, wherein the mobile device is configured to access items associated with an electronic messaging account;

filtering first items associated with the electronic messaging account to obtain an item relevant to the determined geographical location or the determined temporal information further comprising:

determining geographical location or temporal information for the first items;

comparing the geographical location or temporal information for the first items with the determined geographical location or the determined temporal information of the mobile device, respectively; and filtering the first items to obtain the relevant item, based on the comparison;

identifying an event, for user participation, based on the relevant item;

filtering second items associated with the electronic messaging account to obtain one or more items contextually relevant to the identified event, the second items being different than the filtered first items and the event, the obtained one or more items comprising an event characteristic which is shared with the relevant item, and which is different than a geographical characteristic or a temporal characteristic; and providing for display on the mobile device, the relevant item and the one or more items contextually relevant to the identified event, wherein the relevant item provided for display is differentiated from other items of the electronic messaging account.

16. The machine-readable medium of claim 15, wherein filtering the second items further comprises:

determining historical information for the second items;

determining historical information for the relevant item;

comparing the historical information for the second items with the historical information for the relevant item; and filtering the second items to obtain the one or more items contextually relevant to the identified event, based on the comparison.

17. The machine-readable medium of claim 16, wherein historical information for an item comprises information about the item's source, individuals identified by the item, one or more destinations identified by the item, or a user's prior interactions with the individuals identified by the item.

18. The machine-readable medium of claim 15, further comprising assigning the relevant item and the one or more items contextually relevant to the identified event to a folder that is differentiated from other folders of the electronic messaging account.

19. The machine-readable medium of claim 18, further comprising assigning the relevant item and the one or more items contextually relevant to the identified event to different subfolders within the folder based on the relevant item's temporal or geographical relevance.

20. The machine-readable medium of claim 15, wherein providing for display further comprises:

assigning a color to the relevant item and the one or more items contextually relevant to the identified event, wherein, the assigned color is based on whether the relevant item is relevant to the determined geographical location, temporal information, or both; and providing for display, the relevant item and the one or more items contextually relevant to the identified event in the assigned color.

* * * * *